(12) United States Patent
Whiting

(10) Patent No.: US 7,949,373 B2
(45) Date of Patent: May 24, 2011

(54) COMBINED TELEPHONE AND CREDIT TRANSACTION ENABLER

(76) Inventor: Jonathan Merrill Whiting, Oak Bluffs, MA (US)

( * ) Notice: Subject to any disclaimer, the term of this patent is extended or adjusted under 35 U.S.C. 154(b) by 713 days.

(21) Appl. No.: 11/653,606

(22) Filed: Jan. 16, 2007

(65) Prior Publication Data

US 2008/0169351 A1    Jul. 17, 2008

(51) Int. Cl.
*H04M 1/38* (2006.01)

(52) U.S. Cl. ........................................ 455/557

(58) Field of Classification Search ............... 235/493; 455/557; 150/147
See application file for complete search history.

(56) References Cited

U.S. PATENT DOCUMENTS

| 4,102,493 A | 7/1978 | Moreno | 235/419 |
| 4,404,464 A | 9/1983 | Moreno | 235/438 |
| 5,317,636 A | 5/1994 | Vizcaino | 705/65 |
| 5,982,520 A | 11/1999 | Weiser et al. | 398/126 |
| 6,079,621 A | 6/2000 | Vardanyan et al. | 235/487 |
| 6,698,654 B1 | 3/2004 | Zuppicich | 235/380 |
| 2003/0004876 A1* | 1/2003 | Jacobson | 705/41 |
| 2006/0074698 A1* | 4/2006 | Bishop et al. | 705/1 |
| 2006/0238968 A1* | 10/2006 | Maatta et al. | 361/683 |
| 2006/0268528 A1 | 11/2006 | Zadesky | 361/728 |

FOREIGN PATENT DOCUMENTS

ES    2186534    5/2003

OTHER PUBLICATIONS http://www.gae.ucm.es/~padilla/extrawork/tracks.html by Luis Padilla Visdómine.
http://www.rfidjournal.com/article/articleview/1468/1/1/ by RFID Journal.
http://www.rfidjournal.com/article/articleview/1646/1/1/ by RFID Journal.
http://www.findcreditcards.org/reports/contactlessreport.pdf by Jimmy Atkinson, Apr. 3, 2006.

* cited by examiner

*Primary Examiner* — Lewis G West
*Assistant Examiner* — David Bilodeau
(74) *Attorney, Agent, or Firm* — Ernest D. Buff; Ernest D. Buff & Associates LLC; Harry Anagnostopoulos

(57) ABSTRACT

A credit transaction enabled cell phone has its back removably attached to a plate by a double-sided tape or clamps. The plate is attached to a hinge, which carries a U shaped credit card retainer second element. A credit card is carried by the credit card retainer second element in between the two arms of the U shape. The interior surfaces of the arms of the U shape are rubberized, and apply compressive forces to the credit card, securing the card by friction. The hinge may be opened from the closed transpiration position to extend the credit card from the cell phone, and swiped in a swiping credit card reader, using the cell phone as a handle. The credit card may be extracted from the U shaped credit card retainer and used for manual imprint or with an automatic credit card reader, and replaced after use.

3 Claims, 3 Drawing Sheets

COMBINED TELEPHONE AND CREDIT TRANSACTION ENABLER

BACKGROUND OF THE INVENTION

1. Field of the Invention

The present invention relates to wireless communication devices such as cellular phones and personal digital assistants; and, more particularly, to a cellular phone or personal digital assistant having added features that enable the completion of credit transactions in a secure manner.

2. Description of the Prior Art

Numerous prior art technologies exist for cell phones and their combination with other functions. Many of the cell phones today carry a smart card adapted to provide easy access to a phone and address book; such features are commonly present in personnel digital assistants. Several of the PDA manufacturers have also incorporated cell phone features with their products. Recently, cell phones have incorporated MP3 music playing capability, voice recording features, and digital photography, including flash features. Many of the cell phones communicate with computer systems using hard wire connections such as USB2 or Bluetooth wireless communication. None of these cell phone or PDA technologies enable the completion of credit card transactions in a secure manner.

The development of retail electronic commerce has been relatively slow in spite of the perceived demand for such trade. The single greatest deterrent to the expansion of retail electronic commerce is the potential for fraud. This potential for fraud has been a major concern for credit card companies and financial institutions, as well as customers and providers of goods and services. Systems are therefore tailored to verify that the bank issued card with all the secure information is provided directly to the verifying computer that is connected by Internet connection to the card reader.

Magnetic stripe in a credit card has several bits of information coded in the magnetic strip and is according to specifications set forth by several organizations. Numerous International Organization for Standardization standards, including ISO 7810, ISO 7811, ISO 7812, ISO 7813, and ISO 4909, define the physical properties of the card, including size, flexibility, location of the magnetic -stripe, and magnetic characteristics. They also provide the standards for financial cards, including the allocation of card number ranges to different card issuing institutions. In most magnetic stripe cards, the magnetic stripe is contained in a plastic-like film. The magnetic stripe is located 0.223 inches (5.66 mm) from the edge of the card, and is 0.375 inches (9.52 mm) wide. These dimensional requirements must be strictly met in order the swipe type or mechanical card readers to read the information encoded in the magnetic strip properly. The magnetic stripe contains three tracks, each 0.110 inches (2.79 mm) wide. Tracks one and three are typically recorded at 210 bits per inch (8.27 bits per mm), while track two typically has a recording density of 75 bits per inch (2.95 bits per mm). Each track can either contain 7-bit alphanumeric characters, or 5-bit numeric characters. Magnetic stripes come in two varieties: high-coercivity (HiCo) and low-coercivity (LoCo). High-coercivity magstripes are harder to erase, and therefore are appropriate for cards that are frequently used or that require a long life. A card reader can read either type of magnetic stripe, and a high-coercivity card writer may write both high and low-coercivity cards (most have two settings, but writing a LoCo card in HiCo mode will still work), while a low-coercivity card writer may write only low-coercivity cards. The information on track one of financial cards is contained in several formats, Formats A through Z. Format A is reserved for proprietary use of the card issuer. Format B is described below, Formats C through M are reserved for use by ANSI Subcommittee X3B10 and Formats N-Z are available for use by individual card issuers. Format B has the following track details of magnetically coded data. The details of the tracks are set forth at http://www.gae.ucm.es/~padilla/extrawork/tracks.html., which contains details of ISO 7813 for tracks 1 and 2 and ISO 4909 for track 3.

Track one, Format B: Start sentinel—one character (generally '%'), Format code="B"—one character (alpha only), Primary account number—up to 19 characters, Field Separator—one character (generally '^'), Name—two to 26 characters, Field Separator—one character (generally '^'), Expiration date—four characters, Service code—three characters, Discretionary data—may include Pin Verification Key Indicator (PVKI, 1 character), Pin Verification Value (PVV, 4 characters), Card Verification Value or Card Verification Code (CVV or CVK, 3 characters), End sentinel —one character (generally '?') and Longitudinal redundancy check (LRC)—one character, LRC is a form of computed check character.

The format for track two, developed by the banking industry (ABA), is as follows: Start sentinel—one character (generally ';'), Primary account number—up to 19 chars, Separator—one char (generally '='), Expiration date—four characters, Service code—three characters, Discretionary data—as in track one and End sentinel—one character (generally '?'), LRC—one character.

The format for track three, as specified in ISO 4909 is as follows: Start sentinel—one character (generally ';'), Format code—two characters (numeric) See description below, Primary account number—up to 19 characters, Field Separator—one character (generally '='), Country code optional, 3 characters, Currency code 3 characters, Currency Exponent 1 characters, Amount Authorized per Cycle 4 characters, Amount remaining this cycle 4 characters, cycle begin (validity date) 4 characters, cycle length 2 characters, retry count 1 character, Pin control parameters (optional) 6 characters, Interchange controls 1 characters, PAN Service restriction 2 characters, SAN-1 Service Restriction 2 characters, SAN-2 Service Restriction 2 characters, Expiration date (optional) 4 characters, Card Sequence number 1 character, Card Security Number optional, 9 characters, First subsidiary account number optional, Secondary subsidiary account number optional, Relay Marker 1 character, Cryptographic Check Digits optional, 6 characters. Discretionary Data, End sentinel—one character (generally '?') and Longitudinal redundancy check (LRC)—one character. The Format codes are (field 2): 00: Not valid for international interchange, 01-02: Bank/financial. These are the formats described here, 03-19: Reserved for future use by ISO/TC 68, 20-89: Reserved for future use by ISO/TC 95 SC 17. 90-99: Reserved for proprietary use of card issuer, but not for international interchange.

Due to the complex structure of the details contained in the three tracks of the magnetic stripe, it is not easily possible to emulate this magnetic stripe data using a non-financial institution provided credit transaction device. The data contained is alphanumeric and many of the details in the magnetic stripe are unknown to the user of the credit card or the merchant receiving the credit card. Moreover, the data contained is only interpreted by a magnetic card reader that is connected by the Internet to a financial institution computer. Therefore, the physical presence of the financial institution provided credit card verifies uniquely the validity of the credit transaction. In case the card is not physically available, as in a telephone credit order or Internet credit order, the validity is of the user is verified by ascertaining the user name, user billing address, and a unique security code printed on the back of the card. This information is not present in the magnetic stripe of the credit card. In many instances, a merchant accepting a credit card will call the credit card company for authorization of the credit transaction.

Another approach for a credit transaction is to use a smart card for providing information needed for credit transactions. Smart cards are a newer generation of card containing an integrated circuit chip. They are used in Europe, Thailand and in other countries. Recently, the American Express card and the Chase Master card were equipped with an embedded smart chip of the contactless RFID type in addition to a conventional magnetic stripe. The smart card may be of the contact type, wherein metal contacts connect the card physically to the reader device. The other form of the smart card may be a contactless card that uses a magnetic field or radio frequency (RFID) for proximity reading. 'Hybrid' smart cards include a magnetic stripe in addition to the chip—this is most common in payment cards, so that the cards are also compatible with payment terminals that do not include a smart card reader. Smartcards generally conform to one or more parts of ISO standard 7816. Smartcards and smartcard readers are disclosed by patents to Innovation. They are also disclosed by U.S. Pat. No. 6,698,654 to Zuppicich, which teaches a method of interfacing with a data storage card. Also see, for example, U.S. Pat. Nos. 4,102,493 and 4,404,464 to Moreno, which disclose systems for storing and transferring data and a method and apparatus for electrically connecting a removable article, in particular, a portable electronic card.

In Europe, EMV is a standard for interoperation of IC cards ("Chip cards") and IC capable POS terminals, for authenticating credit and debit card payments. The name EMV comes from the initial letters of Europay, MasterCard and VISA, the three companies, which originally cooperated to develop the standard. Europay International SA was absorbed into Mastercard in 2002. JCB (formerly Japan Credit Bureau) joined the organization in December 2004. IC card systems based on EMV are being phased in across the world, under names such as "IC Credit" and "Chip and PIN". The EMV standard defines the interaction at the physical, electrical, data and application levels between IC cards and IC card processing devices for financial transactions. Portions of the standard are heavily based on the IC Chip card interface defined in ISO 7816. The system is not compatible with the earlier Carte Bleue smart cards systematically deployed in France since 1992. However, Carte Bleue is also moving towards the EMV standard. The purpose and goal of the EMV standard is to allow secure interoperation between EMV compliant IC cards and EMV compliant credit card payment terminals throughout the world. There are two major benefits to moving to EMV based credit card payment systems: improved security (with associated fraud reduction), and the possibility for finer control of "offline" credit card transaction approvals.

EMV financial transactions are more secure against fraud than traditional credit card payments which use the data encoded in a magnetic stripe on the back of the card. This is due to the use of encryption algorithms such as DES, Triple-DES, RSA and SHA to provide authentication of the card to the processing terminal and the transaction processing center. However, processing is generally slower than an equivalent magnetic stripe transaction. It is due to cryptography overhead and time involved in messages transmissions between the card and the terminal. The increased protection from fraud has allowed banks and credit card issuers to push through a 'liability shift' such that merchants are now liable (as from 1 Jan. 2005) for any fraud that results from non-EMV transactions on their systems. Although not the only possible method, the majority of implementations of EMV cards and terminals confirm the identity of the cardholder by requiring the entry of a PIN (Personal Identification Number) rather than signing a paper receipt. Whether or not PIN authentication takes place depends upon the capabilities of the terminal and programming of the card. For more details of this (specifically, the system being implemented in the UK) see Chip and PIN. In the future, systems may be upgraded to use other authentication systems, such as biometrics, which are generally not considered economical as of 2004.

In this contactless smart card, the chip contained within the card communicates with the card reader through RFID induction technology (at data rates of 106 to 848 kbit/s). These cards require only close proximity to an antenna to complete a transaction. They are often used when transactions must be processed quickly or hands-free, such as on mass transit systems, where smart cards can be used without even removing them from a wallet. The standard for contactless smart card communications is ISO/IEC 14443, dated 2001. It defines two types of contactless cards ("A" and "B"), allows for communications at distances up to 10 cm. There had been proposals for ISO 14443 types C, D, E and F that have been rejected by the International Organization for Standardization. An alternative standard for contactless smart cards is ISO 15693, which allows communications at distances up to 50 cm. Examples of widely used contactless smart cards are Hong Kong's Octopus card and Paris' Calypso/Navigo card, which predate the ISO/IEC 14443 standard. These smart cards are used for public transportation and other electronic purse applications. A related contactless technology is RFID (radio frequency identification). In certain cases, it can be used for applications similar to those of contactless smart cards, such as for electronic toll collection. RFID devices usually do not include writeable memory or microcontroller processing capability as contactless smart cards often do. There are dual-interface cards that implement contactless and contact interfaces on a single card with some shared storage and processing. An example is Porto's multi-application transport card, called Andante, that uses a chip in contact and contactless (ISO 14443B). Like smart cards with contacts, contactless cards do not have a battery. Instead, they use a built-in inductor to capture some of the incident radio-frequency interrogation signal, rectify it, and use it to power the card's electronics. The applications of smart cards include their use as credit or ATM cards, SIMs for mobile phones, authorization cards for pay television, high-security identification and access-control cards, and public transport and public phone payment cards.

Smart cards may also be used as electronic wallets. The smart card chip can be loaded with funds, which can be spent in parking meters and vending machines or at various merchants. Cryptographic protocols protect the exchange of money between the smart card and the accepting machine. Examples are Proton, GeldKarte, Moneo and Quick.

A quickly growing application involves digital identification cards. In this application, the cards are used for authentication of identity. The most common example is in conjunction with a PKI. The smart card will store an encrypted digital certificate issued from the PKI along with any other relevant or needed information about the card holder. Examples include the U.S. Department of Defense (DoD) Common Access Card (CAC), and the use of various smart cards by many governments as identification cards for their citizens. When combined with biometrics, smart cards can provide two- or three-factor authentication. Smart cards are a privacy-enhancing technology, for the subject carries possibly incriminating information about him all the time. By employing contactless smart cards, that can be read without having to remove the card from the wallet or even the garment it is in, one can add even more authentication value to the human carrier of the cards.

Smart cards have been advertised as suitable for these tasks, because they are engineered to be tamper resistant. The embedded chip of a smart card usually implements some cryptographic algorithm. Information about the inner workings of this algorithm can be obtained if the precise time and electrical current required for certain encryption or decryption operations is measured. A number of research projects have now demonstrated the feasibility of this line of attack. Countermeasures have been proposed. Smart cards are widely used to protect digital television streams. See television encryption for an overview, and VideoGuard for a specific example of how smartcard security worked (and was cracked). Another problem of smart cards may be the failure rate. The plastic card in which the chip is embedded is fairly flexible, and the larger the chip, the higher the probability of breaking. Smart cards are often carried in wallets or pockets—a fairly harsh environment for a chip. However, for large banking systems, the failure-management cost can be more than offset by the fraud reduction.

Gujarat was the first state in India that introduced the smart card license system. In 1999, Gujarat introduced this innovative system and found its implementation to be a real challenge. As of now, the Gujarat Government has issued 5 million smart card driving licenses to its people. This card is basically a plastic card having ISO 7810 certification and an integrated circuit, capable of storing and verifying information according to its programming. To avoid corruption and mismanagement of driving license, in the year 1999, Gujarat State Government launched the smart card driving license system, which has become the success story for different states of India and overseas countries such as USA. However, the first smart driver's license in the world was issued in 1995 in Mendoza, a province of Argentina. Mendoza has a high level of road accidents, driving offenses, and a poor record of recovering outstanding fines. The smart licenses keep an up-to-date record of driving offenses and unpaid fines. They also store personal information, license type and number, and a photograph of the holder. Emergency medical information like blood type, allergies, and biometrics (fingerprints) can be stored on the chip if the cardholder wishes. The Argentina government anticipates that this new system will help to recover more than $10 million per year in fines.

Recently American Express and Chase Master card have begun to rely on encryption algorithms to safeguard data present in the smart card. That data can be accessed by any smart card reader that is present at a distance. Since the smart card has a large amount of person specific secure data, which are not in the encrypted part, it is easily available to any card readers and users are hesitant to use routinely smart cards for credit transactions. In addition, double billing is also possible since there is no end point specified for a given credit transaction. More recently, due to large potential market opportunity in Asia, where smart cards are accepted, there is a strong development effort to include an RFID smart card contactless device in cell phones, as indicated in web pages http://www.rfidjournal.com/article/articleview/1468/1/1/, http://www.rfidjournal.com/article/articleview/1646/1/1/, and http://www.findcreditcards.org/reports/contactlessreport.pdf. The key problems are due to the fact that the RFID smart card devices communicate with any code reader and the encryption could be cracked by a skilled person. The plastic cases of cell phones do not readily permit radio frequency communication with an RFID chip embedded in a cell phone. Recently Zadesky of Apple Computer Inc. has filed a patent application. This application bears publication number 20060268528 and is entitled handheld computing device. The device disclosed by the Zadesky publication, may be a cell phone having a zirconia or alumina cell phone casing to permit radio frequency coupling with an RFID device embedded within the cell phone.

U.S. Pat. No. 5,317,636 to Vizcaino discloses method and apparatus for securing credit card transactions. This method involves a so-called "smart" credit card, which includes a processor, a memory, and a display window. When used, the card produces a verification number, which is based on a transaction sequence number and an encryption algorithm stored in the memory of the card. The verification number produced by the card is read in the display window and transmitted to a verification computer. The computer uses the verification number, together with a de-encryption algorithm, to produce a computed transaction sequence number. If the computed transaction sequence number corresponds to a transaction sequence number stored in the memory of the computer, then the computer will authorize the transaction, otherwise it will not. Both the card and computer change their respective transaction sequence numbers, such as by incrementation, so that different transaction sequence numbers are stored in the respective memories, for the production of a different verification number for the next transaction. There is no cell phone in this secure transaction device.

U.S. Pat. No. 5,982,520 to Weiser, et al. discloses personal storage device for application and data transfer. This is a personal storage device for receipt, storage, and transfer of digital information to other electronic devices. It has a pocket sized crush resistant casing with a volume of less than about ten cubic centimeters. A processor is positioned within the casing cavity and attached to the crush resistant casing, while a memory module also positioned within the casing cavity is configured to store received executable applications and data. An infrared transceiver is mounted on the crush resistant casing and in electronic communication with the processor and memory module to provide for receipt and storage of executable applications, and receipt, storage, and transfer of digital information to other electronic devices. The digital information stored by the personal storage device can be intermittently synchronized with other electronic devices. There is no provision in this device for a cell phone or credit transaction.

U.S. Pat. No. 6,079,621 to Vardanyan, et al. discloses secure card for E-commerce and identification. This disclosure uses a secure card such as a credit card having a magnetic strip. The magnetic strip is coated with a thin amorphous layer having electrical characteristics and a processor. In a first state, the amorphous layer acts to interfere with reading of information from the magnetic strip. Identification of a user of the card as an authorized user thereof results in a second state in which the information stored in the magnetic strip is accessible. For example, biometric identification or the use of a PIN entered either directly into the card or through an input terminal cause the processor to switch power from the amorphous strip thereby removing the interference and unmasking the information on the magnetic strip. The masking coating is a dielectric which is electrically charged to create a dipole. This dipole only produces electrostatic fields, which does not interfere with the readability of the magnetic information in the card, contrary to what is claimed in the patent disclosure. The interfering coating and its protective coating has thickness which prevents direct contact between the magnetic card reader and the magnetic strip, producing error probe readings. There is no cell phone in this masked magnetic card.

ES Patent ES2186534 to Antona Archilla Diego discloses smart card standard port adaptor for Internet connection devices designed for telematic transactions. This smart card standard port adaptor consists of an adaptor for connecting smart cards to a standard port—for example, a serial port—for devices connected to communication networks (Internet, LAN, WAN, etc.). It consists of a device connector with an Internet Connection, an active circuit board, and a Smart Card Device Connector, to which an improvement is suggested in the form of a clamp for the smart card with grooves or the use of another type of connector for any smart card. The smart card adaptor is compatible both mechanically and electronically with the present or future standards of ports and cards, and performs telematic transactions of any type, either anonymous or with authentication, from any device with a connection to communication networks. The adapter mechanically connects the smart card to an Internet enabled device and therefore has to be physically plugged in. A smart card located in a cell phone cannot be plugged into an adapter in this manner. The smart card has to communicate with the Internet enabled device wirelessly and this is not possible with the disclosed device.

Notwithstanding the efforts of prior art workers to construct a cell phone with credit transaction capability in a secure environment, there is no cell phone available in the market place that meets this need. There is clearly a need for a cell phone that also provides credit transaction capability so that a person does not have to carry around a bulky wallet or purse and fish around therein for a credit card. Practically every person carries a cell phone and it would be extremely advantageous to have credit transaction capability in combination with a cell phone.

SUMMARY OF THE INVENTION

The present invention provides a cell phone configuration that additionally offers credit transaction capability within a secure environment. The cell phone device uses well established magnetic cards. Security elements provided by the credit card provider are attached with a hinge that secures the credit card to the cell phone. When the hinge is closed, the credit card lies flat against the cell phone. When the hinge is opened, the credit card protrudes from the cell phone with the magnetic strip distal therefrom. With this arrangement, the credit card can be readily swiped into a credit card reader. Since the magnetic stripe is the proper location with the three tracks having appropriate credit card codes, the swiped card is read by the reader properly. After use, the hinge securing the credit card is closed keeping the credit card in a unobtrusive position against the cell phone.

In certain cases, the credit card may be required to be separated from the hinge. Mechanical readers of credit cards such as are used in automatic parking lots require the credit card to be inserted into a slot. The electrically operated machinery of the mechanical card reader reads the card and spits it out after completion of the credit transaction. The credit card is removably attached to the hinge and is reinserted back to meet these requirements.

The hinge construction has two elements attached to each other with a hinge. One of the elements is a plate with a size nearly the same as that of the credit card. This plate element is secured to the back of a cell phone using a double-edged tape or a clamp attachment. The other element is a U shaped body with a slot for inserting the credit card. The interior two parallel faces of the U shaped element have rubberized pads. When a credit card is inserted into the U shaped rubberized slot, the rubberized elements are compressed applying compressive forces. Due to the friction between the rubberized elements and the credit card, the credit card is retained in place, but can be easily removed by pulling the credit card outward. After using the credit card in a mechanical reader, the credit card may be inserted back into the U shaped slot.

The cell phone with the attached credit card is no larger than a cell phone without a credit card. Most cell phones are sized similar to that of a standard credit card. Consequently, this assembly has a natural appearance, and fits commercially available cell phone carrying cases. If the cell phone or the credit card is lost, the procedure for reporting to the credit card issuing financial authority is the same is as that currently in place for reporting lost or stolen credit cards. Unlike the RFID or other smart card devices, which require new procedures that must be implemented in place to address security issues, the present invention requires no change to existing security provisions unchanged while, at the same time, providing convenience factors desired by credit card or cell phone users.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

The present invention relates to a unique attachment between a credit card to a cell phone; the attachment being such that the credit card is available for use in a credit card swiping machine. The cell phone back surface is attached to a two element hinged attachment device. The attachment device has two elements attached to each other by a hinge that permits angular movement between the elements. The first element of the attachment device is a plate that may be attached to the back side of the cell phone using a double sided tape or attachment clamps. The other element of the attachment device is a U shaped credit card retainer. The U shaped credit card retainer has rubberized parallel faces that apply compressive forces to the credit when the credit card is inserted into the U shaped slot.

The cell phone may be smaller or larger than the credit card. However, the plate element of the attachment is similarly sized to the credit card and prevents any bending of the credit card when the hinge is in the closed position. When the plate element is attached to the back of the cell phone either by a double-edged tape or a clamp, the plate element is integrally attached to the back of the cell phone. When the credit card is inserted into the U shaped slot of the second element, it becomes part of the cell phone. The hinge between the first element and the second element allows the credit card to be extended from the cell phone and the magnetic stripe becomes available for swiping in a credit card swiping reader. The cell phone actually functions as a handle to hold the credit card as it is being swiped.

When the credit card must be used in a mechanical credit card reader, the user pulls the credit card from the U slot of the second element, releasing the credit card. The credit card is inserted into the mechanical credit card reader, which spits out the card after receiving the credit card's magnetic stripe information. The credit card is now inserted back into the U shaped slot of the second element.

Figure 1:
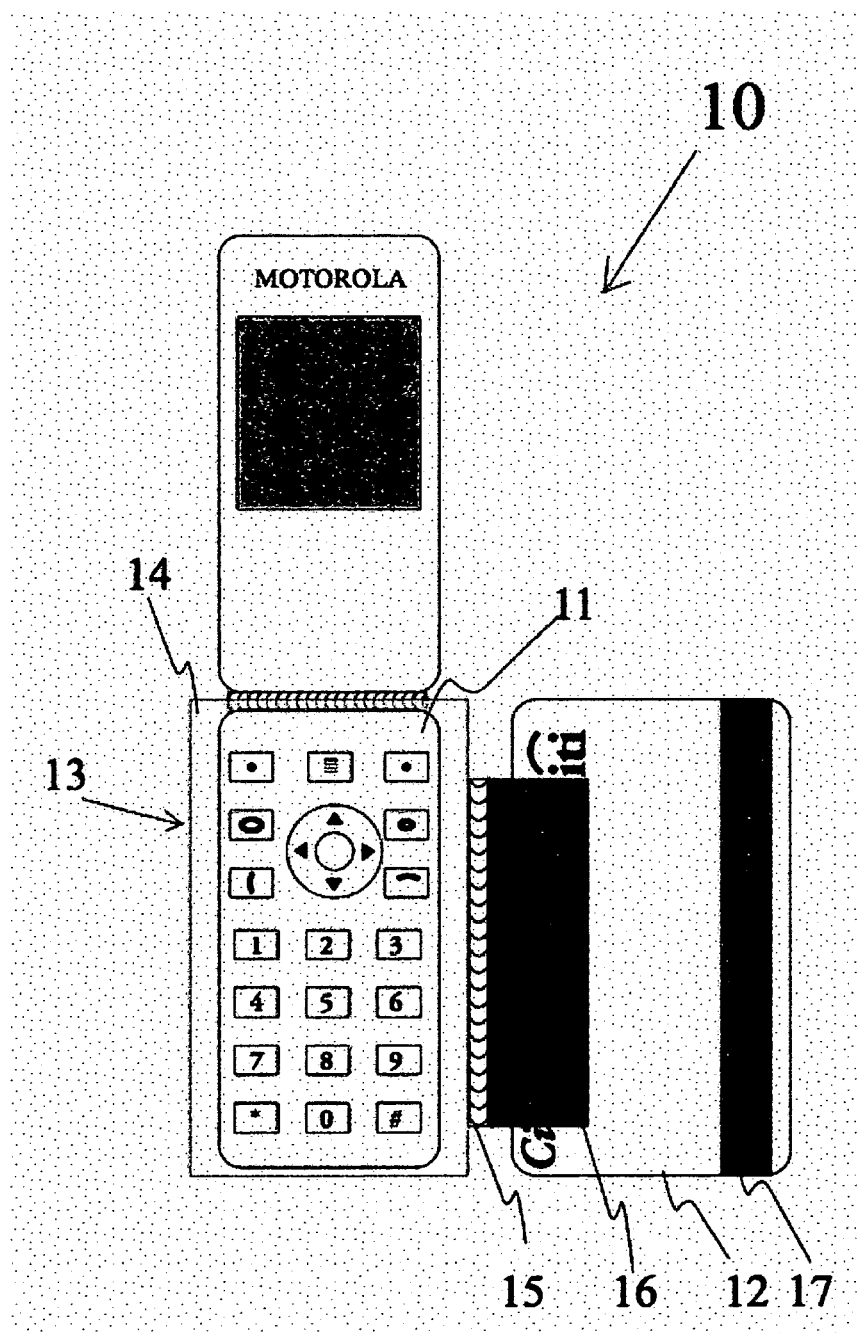
FIG. 1 is a cell phone with a credit card attached with a hinged connection in the open position.

FIG. 1 illustrates generally at 10 a cell phone 11 with a credit card 12 attached by a hinged connection attachment device 13 when the credit card is in the open position, ready for swiping in a swiping credit card reader. On the backside of the cell phone, there is attached the plate 14, the first element of the attachment device 13, and the hinge 15 secured to the plate 14. The second element, which is a U shaped credit card retainer 16, shown partially transparent for clarity, is also attached to the hinge 15. The credit card extends from the cell phone outward with the magnetic stripe 17 facing the view of the illustration. The magnetic stripe may be away from the view and during use it has to be oriented according to the reading needs of the swiping credit card reader. During this swiping action, the credit card remains integral with the cell phone and the cell phone acts as a handle, facilitating the swiping movement.

Figure 2:
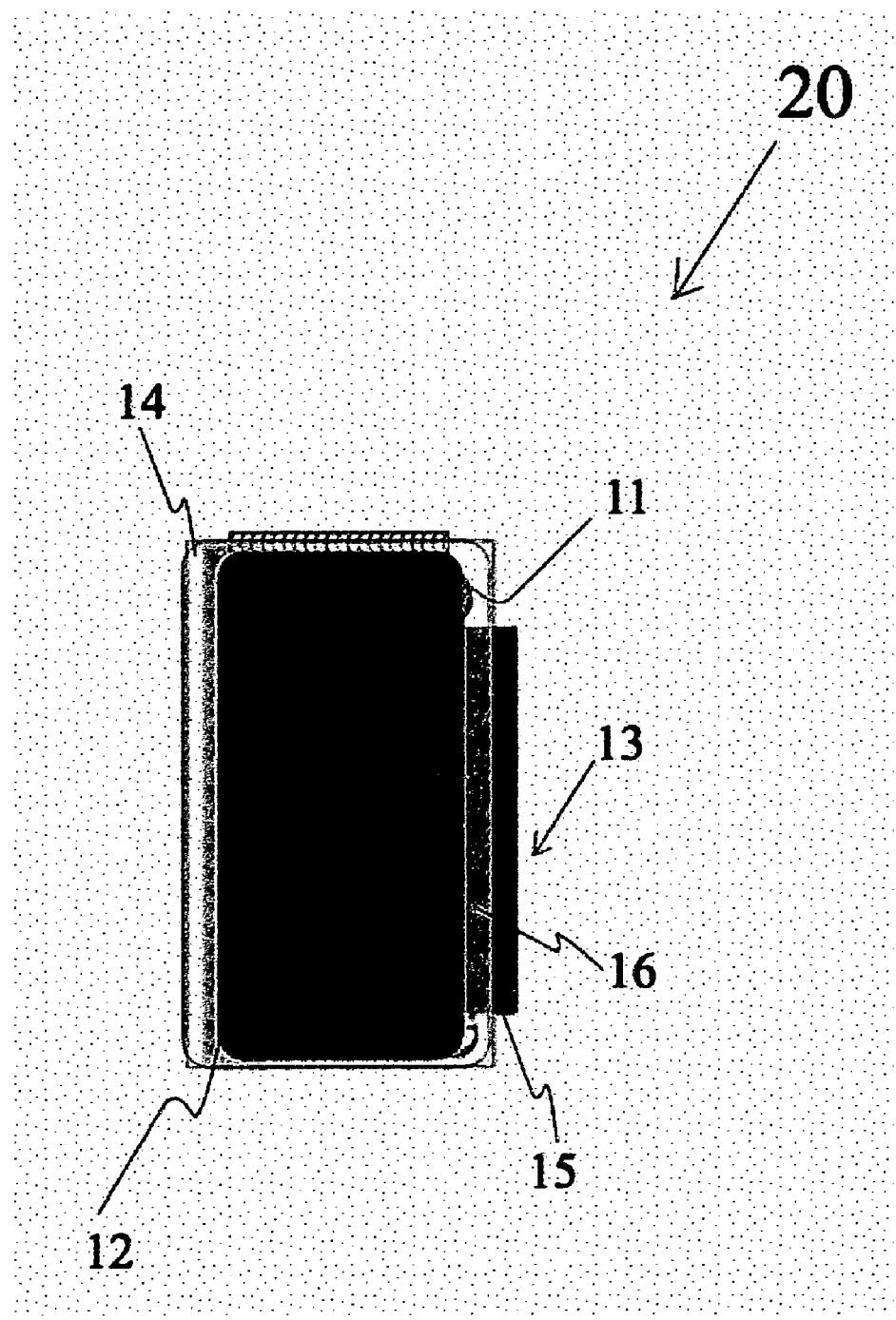
FIG. 2 is a front view of a cell phone with a credit card attached with a hinged connection in the closed position.

FIG. 2 illustrates generally at 20 the cell phone 11 of FIG. 1 with the credit card 12 attached by the hinge connection attachment device 13 when the credit card is in the closed position. The plate element 14 of the attachment device is attached to the backside of the cell phone. The hinge 15 connects the first element of plate 14. A second U shaped credit card retainer 16 is also attached to the hinge. The plate 14 is approximately of the same size as that of the credit card 12. The cell phone together with the closed credit card is unobtrusive and transported easily in the pocket or in a cell phone carrying case. The user does not have to carry an additional bulky wallet or purse to have capability for completing a credit transaction in a secure manner. Since the card is always present with the cell phone, the user may place telephone or Internet credit transaction orders by providing the security code printed on the back face of the credit card.

Figure 3:
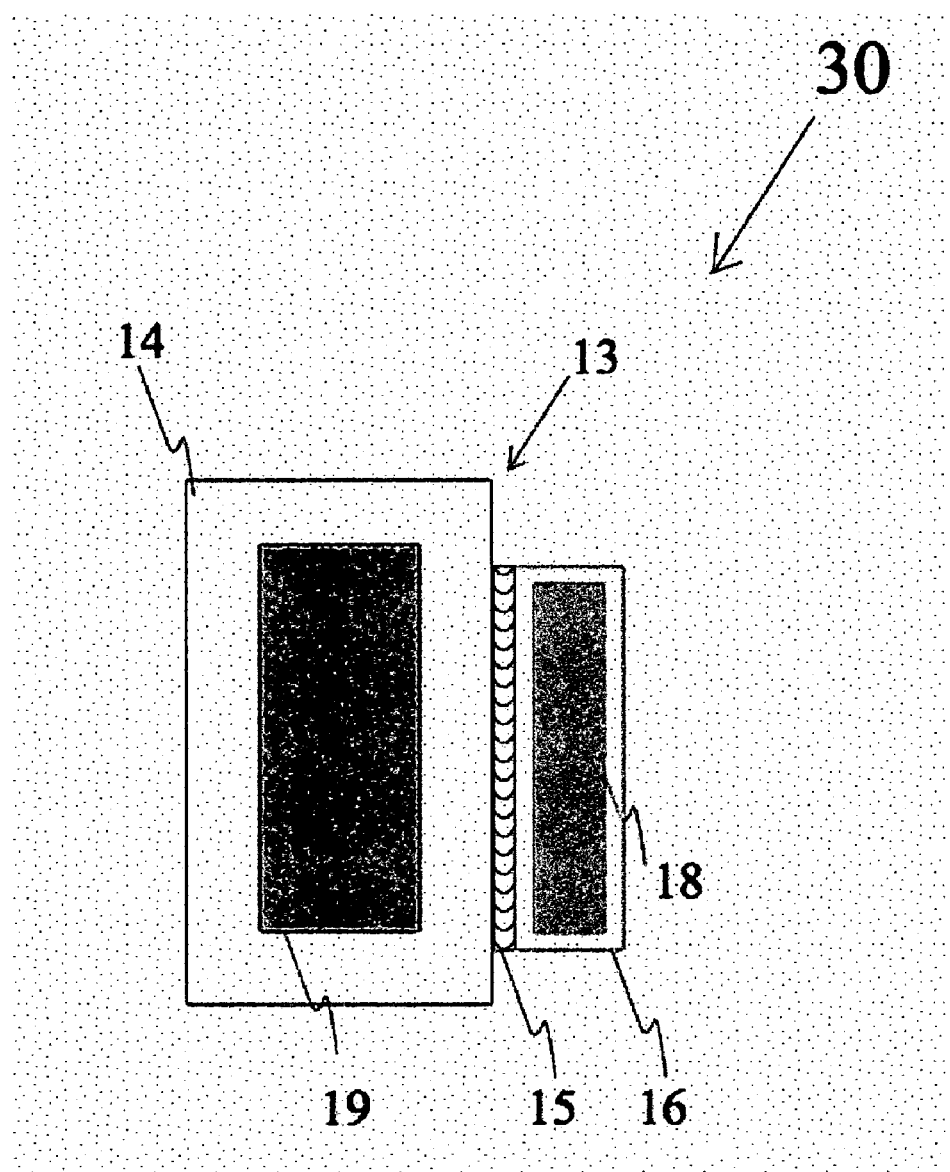
FIG. 3 illustrates the two element hinged connection attachment device that secures the credit card to the cell phone.

FIG. 3 illustrates generally at 30 the attachment device for attaching the credit card to the back of the cell phone. The attachment device 13 comprises a plate first element 14, the hinge 15 and the U shaped credit card retainer 16. The plate first element 14 has a double-sided tape 19 provided for attachment with a cell phone. The attachment to the cell phone may use alternate methods including clamps (not shown). Each of the interior faces of the U shaped retainer 16 is rubberized as shown at 18 to grab and apply compressive force to the credit card.

The combined cell telephone and credit transaction enabler system comprises the following features in combination:
1) a cell phone;
2) the cell phone having a back attached to a hinged credit card attachment means;
3) the hinged attachment means comprising a plate first element, a hinge and a U shaped credit card retainer second element;
4) the back of the cell phone being secured to the plate of the attachment means by a double-edged tape or clamps;
5) the interior surfaces of the U shaped credit card retainer being rubberized to apply compressive forces to the credit card, enabling removable credit card retention;
6) the hinge allowing the credit card retained by the U shaped credit card retainer to be extended from the cell phone for use in swiping credit card readers using the cell phone as credit card handle during card swiping;
7) the hinge allowing the credit card to be collapsed on the back side of the cell phone for easy transportation; and
8) the credit card being removed from the U shaped credit card holder for use in manual embossing machines or automatic credit card readers and replaced after an automatic card read operation;
whereby the user has cell phone and credit card attached together enabling secure credit transactions without a need for bulky wallets or purse.

Having thus described the invention in rather full detail, it will be understood that such detail need not be strictly adhered to, but that additional changes and modifications may suggest themselves to one skilled in the art, all falling within the scope of the invention as defined by the subjoined claims

What is claimed is:
1. A credit transaction enabled cell telephone, comprising:
 a. a cell phone;
 b. said cell phone having a back attached to a hinged credit card attachment means;
 c. said hinged attachment means comprising a plate first element, a hinge and a U shaped credit card retainer second element;
 d. said back of said cell phone being secured to said plate of said attachment means, said plate being detachable from said cell phone;
 e. interior surfaces of said U shaped credit card retainer having retaining means being a rubberized pad attached to the interior sides of the U shaped credit card retainer for providing removable credit card retention, said rubberized pad applies compressive forces to said credit card;
 f. said hinge allowing said credit card, retained by said U shaped credit card retainer, to be extended from the cell phone for use in swiping credit card readers while using said cell phone as a credit card handle;
 g. said hinge allowing said credit card to be collapsed on the back side of said cell phone for easy transportation;
 h. said credit card being removed from said U shaped credit card holder for use in manual imprint machines or automatic credit card readers and replaced after an automatic card read operation;
 i. said plate having a size approximate to the size of said credit card; and
 j. said cell phone having a length no longer than the length of said credit card;
whereby the user has a cell phone and credit card attached together, enabling completion of secure credit transactions without need of a bulky wallet or a purse.

2. The credit transaction enabled cell telephone as recited by claim 1, wherein said plate is attached to the back of said cell phone by double sided tape.

3. The credit transaction enabled cell telephone as recited by claim 1, wherein said plate is attached to the back of said cell phone by clamps.

* * * * *